United States Patent [19]

Sumita

[11] Patent Number: 4,931,614
[45] Date of Patent: Jun. 5, 1990

[54] WIRE ELECTRODE VERTICALLY SETTING METHOD AND DEVICE FOR WIRE CUT ELECTRIC DISCHARGE MACHINE

[75] Inventor: Mitsutaka Sumita, Aichi, Japan

[73] Assignee: Mitsubishi Denki Kabushiki Kaisha, Tokyo, Japan

[21] Appl. No.: 358,051

[22] Filed: May 30, 1989

[30] Foreign Application Priority Data

May 31, 1988 [JP] Japan .................. 63-131661

[51] Int. Cl.$^5$ .............................................. B23H 7/10
[52] U.S. Cl. .................................................. 219/69.12
[58] Field of Search ................ 219/69.12, 69.13, 69.17, 219/69.20; 364/474.04; 204/206, 224 M

[56] References Cited

U.S. PATENT DOCUMENTS 4,673,788  6/1987  Buchler ............................ 219/69.12

FOREIGN PATENT DOCUMENTS 54-104099  8/1979  Japan ............................ 219/69.12
58-94930   6/1983  Japan ............................ 219/69.12
58-126025  7/1983  Japan ............................ 219/69.12

Primary Examiner—A. D. Pellinen
Assistant Examiner—Geoffrey S. Evans
Attorney, Agent, or Firm—Sughrue, Mion, Zinn, MacPeak & Seas

[57] ABSTRACT

Method and device for setting a wire guide electrode for a wire cut electric discharge machine perpendicular to a reference surface of a machining table. The device determines and sets an attitude of the wire electrode according to a total number of times of contact of one of upper and lower contact members of a perpendicularity detector in contact with the wire electrode and a ratio of a number of times of contact only of the upper contact member with the wire electrode to a number of times of contact of only the lower contact member with the wire electrode.

10 Claims, 3 Drawing Sheets

SINGLE CHECK WITH PERPENDICULARITY OPERATION

WIRE ELECTRODE VERTICALLY SETTING METHOD AND DEVICE FOR WIRE CUT ELECTRIC DISCHARGE MACHINE

BACKGROUND OF THE INVENTION

This invention relates to a method of setting a wire electrode vertical for a wire cut electric discharge machine, and a device for practicing the method.

FIG. 1 is an explanatory diagram for a description of a conventional method of setting a wire electrode vertical for a wire cut electric discharge machine. In FIG. 1, reference numeral 1 designates a wire electrode; 2, a wire electrode supply reel; 3, a wire electrode take-up reel; 4, a lower guide roller; 5, an upper guide roller; 6, a lower wire guide; and 7, an upper wire guide. The wire electrode 1 is supplied, at a predetermined speed, from the wire electrode supply reel 1 through the lower guide roller 4, the lower wire guide 6, the upper wire guide 7 and the upper wire guide roller 5 to the wire electrode take-up reel 3, so that it is wound on the latter 3. For instance in the case where the wire electrode 1 is a brass wire 0.2 mm in diameter, generally a tensile strength of 800 to 1500 g is applied to it.

Further in FIG. 1, reference numeral 8 designates a wire guide drive unit for allowing the upper wire guide to move two-dimensionally, in the directions of U-axis and V-axis in a horizontal plane. The drive unit 8 is used to taper a workpiece (not shown) as required.

The workpiece is fixedly held on a machining table 10 with suitable clamp means which is movable two-dimensionally in the directions of X-axis and Y-axis in a horizontal plane.

A wire electrode perpendicularity meter unit 12 is provided on the machining table 10. The meter unit 12 comprises: a body 14 secured to the machining table; and an upper contact member 15 and a lower contact member 16 which are coupled to the body 14 in such a manner that the contact member 15 is positioned above the contact member 16 and they are in parallel with each other so that they maybe brought electrically into contact with the wire electrode 1. In addition, the wire electrode perpendicularity meter unit 12 is so designed that the line connecting an upper contact 151 and a lower contact 161 secured respectively to the ends of the upper contact member 15 and the lower contact member 16 is perpendicular to the machining table 10.

The contact signals of the upper contact 151 and the lower contact 161 with the wire electrode 1 are applied, respectively as an upper contact signal 20 and a lower contact signal 21, to a numerical control unit 18. The numerical control unit 18 applies an X-axis drive signal 22 and a Y-axis drive signal 23 respectively to an X-axis drive motor (not shown) and a Y-axis drive motor (not shown) which are provided for the machining table 10, and applies a U-axis drive signal 24 and a V axis drive signal 25 respectively to a U-axis drive motor (not shown) and a V-axis drive motor (not shown) provided for the wire guide drive unit.

The conventional method of setting a wire electrode vertical for a wire cut electric discharge machine will be described with reference to FIG. 2.

FIG. 2 shows a procedure of setting a wire electrode vertical in the direction of X-axis. The following description may be equally applied to the procedure of setting a wire electrode vertical in the direction of Y-axis.

In the case where the upper wire guide 7 is displaced to the right along the U-axis as shown in FIG. 1, the wire electrode 1 is not vertical as shown in FIG. 2(a). That is, the wire electrode 1 is inclined in the direction of U-axis, and both the upper and lower contacts 151 and 161 are off the wire electrode 1.

Therefore, the machining table 10 is moved forth in the direction of X-axis so that the lower contact 161 is brought into contact with the wire electrode. In this operation, the lower contact signal 21 is applied to the numerical control unit 18. Accordingly, simultaneously when the lower contact is brought into contact with the wire electrode, the machining table 10 is stopped. Then, the lower contact 161 is slightly moved back until it is disconnected from the wire electrode, as shown in FIG. 2(b).

Thereafter, the upper wire guide 7 is moved, for instance 1 μm, to the left along the U-axis as shown in FIG. 2(c) so that the wire electrode 1 is raised.

The machining table 10 is moved in the direction of X-axis again, and it is determined whether or not the upper contact 151 and the lower contact 161 have been brought into contact with the wire electrode at the same time; that is, it is detected whether or not the upper contact signal 20 and the lower contact signal 21 have been applied to the numerical control unit 18 at the same time. When it is determined that the upper and lower contacts have not been brought into contact with the wire electrode at the same time, the operation described with reference to FIG. 2(b) is carried out again, and then the operation described with reference to FIG. 2(c) is performed again.

When it is determined that the upper and lower contacts have been brought into contact with the wire electrode at the same time, the machining table, the wire electrode, etc. are positioned as shown in FIG. 2(d). However, for confirmation, the machining table 10 is moved a predetermined distance backwardly, and then moved forwardly to determine whether or not the upper and lower contacts are brought into contact with the wire electrode at the same time. If it is determined that the upper and lower contacts have not been brought into contact with the wire electrode at the same time, then the machining table is set back as shown in FIG. 2(b) again, and it is moved 1 μm again so that the wire electrode is held vertical. This operation is carried out repeatedly until it is detected that both the upper and lower contacts have been brought into contact with the wire electrode. When it is detected that the upper and lower contacts have been brought into contact with the wire electrode, then the wire electrode, the upper and lower contacts, etc. are positioned as shown in FIG. 2(e). Thus, the operation of setting the wire electrode 1 vertical has been accomplished.

In the case where the wire electrode 1 is inclined to the left of U-axis, the above-described method is equally employed to hold the wire electrode 1 vertical with the exception that, in this case, the upper contact 151 is firstly brought into contact with the wire electrode 1.

As is apparent from above description, the conventional method of setting a wire electrode vertical for a wire cut electric discharge machine is intricate and troublesome in practice. In order to determine whether or not the upper and lower contacts 151 and 161 have been brought into contact with the wire electrode at the same time, it is necessary to perform the contact ascertaining operation; that is, it is determined that the wire electrode is held vertical only when the upper and lower contacts are brought into contact with the wire electrode successively twice. Therefore, for instance when the wire electrode 1 is vibrated for some reason (it is liable to be vibrated), the phenomenon that the upper and lower contacts are brought into contact with the wire electrode successively twice may not occur. In this case, the wire raising operation is automatically carried out; that is, it may be performed more times than required, with the result that it takes a relatively long time to set the wire electrode vertical. If the wire electrode is being vibrated, the upper and lower contacts may be brought into contact with the wire electrode at the same time successively twice although the wire electrode is not held vertical yet. In this case, the wire electrode may not be sufficient in perpendicularity.

In order to eliminate the above-described difficulties accompanying the conventional method, for instance Japanese Patent Application (OPI) No. 61420/1982 has disclosed the following method (the term "OPI" as used herein means an "unexamined published application"): The upper and lower contacts are so designed as to be moved with spindles such as those of micrometers. The movements of the upper and lower contacts to the wire electrode are measured, and the amount of correction in position of the upper wire guide is calculated according to the movements thus measured, and the upper wire guide is moved according to the amount of correction thus calculated, to set the wire electrode vertical. However, it should be noted that the conventional method is held under the condition that the wire electrode is not vibrated. In addition, in the conventional method, the operation is manual. Hence, the conventional method is not suitable for the continuous operation or unmanned operation of an electric discharge machine.

SUMMARY OF THE INVENTION

Accordingly, an object of this invention is to eliminate the above-described difficulties accompanying a conventional method of setting a wire electrode vertical for a wire cut electric discharge machine. More specifically, an object of the invention is to provide a method of setting a wire electrode vertical for a wire cut electric discharge machine in which, even when the upper and lower contacts are brought into contact with the wire electrode by vibration of the latter, the perpendicularity of the wire electrode can be determined using a statistical method whereby the wire electrode is automatically set vertical with high accuracy, and a device for practicing the method.

In a method of setting a wire electrode vertical for a wire cut electric discharge machine according to the invention, after it is detected when the upper and lower contacts are brought into contact with the wire electrode at the same time, under this condition the separation and contact of the upper and lower contacts with the wire electrode, which are caused when the wire electrode is being vibrated, are counted at every sampling periods for a predetermined period of time, to obtain a total number of times N of sampling operations. The total number of times N can be obtained by counting the sampling periods (each being for instance 35.5 msec) for the predetermined period of time. More specifically, the total number of times N includes the following data:

$$N = N_1 + N_2 + N_3 + N_4 \quad (1)$$

where $N_1$ is the number of times of allowing the upper and lower contacts to be not in contact with the wire electrode; $N_2$ is the number of time of bringing only the lower contact into contact with the wire electrode; $N_3$ is the number of times of bringing only the upper contact into contact with the wire electrode; and $N_4$ is the number of times of bringing the upper and lower contacts into contact with the wire electrode at the same time.

When, in expression (1), $N_2 + N_3 > K_1$ (where $K_1 < N$) and $k_2 < N_3/N_2 < k_1$ (where $k_1$ and $k_2$ are constants), it is determined that the upper and lower contacts are substantially uniformly in contact with the wire electrode. In other words, the numbers of upper contact signals and lower contact signals provided for the predetermined period of time are counted, and it is determined that the wire electrode has been set vertical when the two numbers thus counted becomes equal to each other.

A device for practicing the above-described method of setting a wire electrode vertical according to the invention, namely, a device for setting a wire electrode vertical comprises: means for extracting a total number of times N of sampling operations; means for judging $N_2 + N_3 > K_1$; means for judging $N_3/N_2 > k_2$; and means for judging $N_1 > N_4$ to determined whether or not the upper and lower contacts have been excessively forwarded when the result of the judgment of $N_2 + N_3 > K_1$ is "NO".

In the invention, after the upper and lower contacts have been brought into contact with the wire electrode at the same time once, a total number of times N of sampling operations with in a predetermined period of time is obtained, and it is determined whether or not $N_2 + N_3 > K_1$, to judge the effect of vibration of the wire electrode on the upper and lower contacts at the current positions. That is, if $N_2 + N_3 > K_1$, the contacts are brought into contact with the wire electrode by vibration of the latter. Therefore, it is determined from $N_3/N_2$ whether or not the upper and lower contacts are substantially uniformly in contact with the wire electrode. If, in contrast, $N_2 + N_3 > K_1$ is not held, the upper and lower wires are away from the wire electrode or they have been moved excessively forwardly. In this case, the positions of the upper and lower contacts and the wire guide are corrected, and the operation of obtaining a total number of times N of sampling operations is obtained again, and the above-described operations are carried out all over again beginning with the operation of obtaining a total number of times N of sampling operations.

If $N_3/N_2 > k_1$ with $N_2 + N_3 > K_1$, only the upper contact is in contact with the wire electrode; and if $N_3/N_2 < k_2$ under the same condition, only the lower contact is in contact with the wire electrode. In this case, the position of the wire guide is corrected, and the above-described operations are carried out again beginning with the operation of obtaining a total number of times N of sampling operations. When $k_2 < N_3/N_2 < k_1$, it is determined that the upper and lower contacts are substantially uniformly brought into contact with the wire electrode. Thus, the wire electrode has been set vertical.

DESCRIPTION OF THE PREFERRED EMBODIMENT

One embodiment of this invention will be described with reference to the accompanying drawings.

Figure 3:
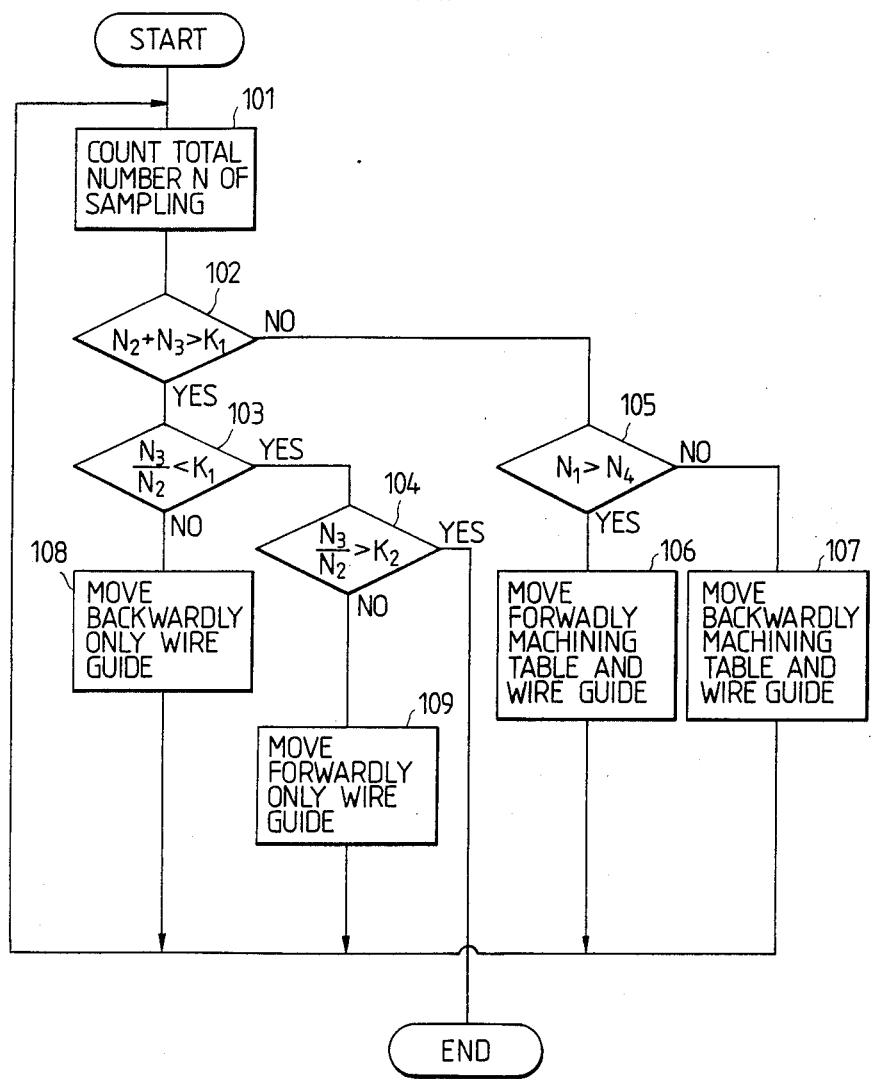
FIG. 3 is a flow chart for a control circuit in a device which practices a method of setting a wire electrode vertical according to this invention.

FIG. 3 is a flow chart for a control circuit of a device which practices a method of setting a wire electrode vertical according to the invention, showing the flow of operations carried out from the time instant that the upper and lower contacts are brought into contact with the wire electrode at the same time for the first time until the wire electrode is set vertical. FIG. 3 shows a method of setting a wire electrode vertical with respect to U-axis and X-axis; however, it should be noted that the same control circuit is provided for V-axis and Y-axis.

In FIG. 3, reference numeral 101 designates a step of extracting a total number of times N of sampling operations in a predetermined period of time after the upper and lower contacts are brought into contact with the wire electrode at the same time for the first time. With the step 101, the numbers of times $N_1$, $N_2$, $N_3$ and $N_4$ in the above-described expression (1) are counted. The total number of times N is the sum of the number of times $N_1$ of allowing both of the upper and lower contacts to be away from the wire electrode, the number of times $N_2$ of bringing only the lower contact into contact with the wire electrode, the number of times $N_3$ of bringing only the upper contact into contact with the wire electrode, and the number of $N_4$ of bringing the upper and lower contacts into contact with the wire electrode at the same time. Therefore, of the numbers of times, those $N_2$ and $N_3$ are essential factors for determination. Let us consider the case where one sampling time is set for instance to 35.5 msec, and the total number of times N is obtained by counting the sampling time for a predetermined period of time. The predetermined period of time is preferably about one second, although it should be as short as possible. The number of times N is set to 30 (N=30) in the embodiment, because it should have a certain value to provide a statistical effect according to the invention, although it depends on the mechanical accuracy of the electric discharge machine used.

Further in FIG. 3, reference numeral 102 designates a step of judging $N_2+N_3>K_1$. That is, with the step 102, the sum of $N_2$ and $N_3$ is obtained from the total number of times N. In the embodiment, $K_1$ is set to 25 ($K_1=25$). However, with the judgment of ($N_2+N_3$) only, it cannot be determined whether or not the frequencies of contact of the upper and lower contacts 151 and 161 are equal. Therefore, it is detected whether the ratio $N_3/N_2$ is in a predetermined range of numerical values.

Therefore, with a judging step 103, it is determined whether or not $N_3/N_2<k_1$. In the embodiment, $k_1$ is set to 3.0 ($k_1=3.0$).

If the result of the determination is "YES", then a step 104 of determining whether or not $N_3/N_2>k_2$ is operated. In the embodiment, $k_2$ is set to 0.3 ($k_2=0.3$). If the result of the determinations is "YES", then the operation of setting the wire electrode vertical is ended because the ratio $N_3/N_2$ is in the predetermined range of numerical values.

If, the result of determination by the above-described determining step 102 is "NO", then both of the upper and lower contacts 151 and 161 are away from the wire electrode 1, or both are in contact with the wire electrode 1 being excessively moved. Therefore, for comparison of $N_1$ and $N_4$, a step 105 for determining whether or not $N_1$ is larger than $N_4$ ($N_1>N_4$) is operated. If the result of determination by the step 105 is "YES", then an X-axis / U-axis 1-$\mu$m forwarding step 106 is operated so that the machining table 10 and the upper wire guide are moved 1 $\mu$m forwardly along X-axis and U-axis, respectively. Thereafter, the above-described step 101 for extraction of a total number of times N of sampling operations is operated again. Thus, the above-described operations are carried out all over again. If, in contrast, the result of the judgment of $N_1>N_4$ is "NO", then an X-axis / U-axis 1-$\mu$m retracting step 107 is operated so that the machining table 10 and the upper wire guide 7 are moved 1 $\mu$m backwardly along X-axis and U-axis, respectively. Then, the step 101 is operated again, and the above-described operations are performed again.

If the result of the judgment of $N_3/N_2 <K_1$ in step 103 is "NO", only the upper contact is in contact with the wire electrode. Therefore, a U-axis only 1-$\mu$m retracting step 108 is operated, so that only the upper wire guide 7 is moved 1 $\mu$m backwardly along U-axis, and then the step 101 for retracting a total number of times N of sampling operations is operated again. And the above-described operations are carried out again.

If the result of the determination of $N_3/N_2>K_2$ by the step 104 is "NO", then only the lower contact is in contact with the wire electrode. Therefore, with a U-axis-only 1-$\mu$m forwarding step 109, only the wire guide 7 is moved 1 $\mu$m forwardly along U-axis, and then the step 101 is operated again, and the above-described operations are carried out again.

Figure 1:
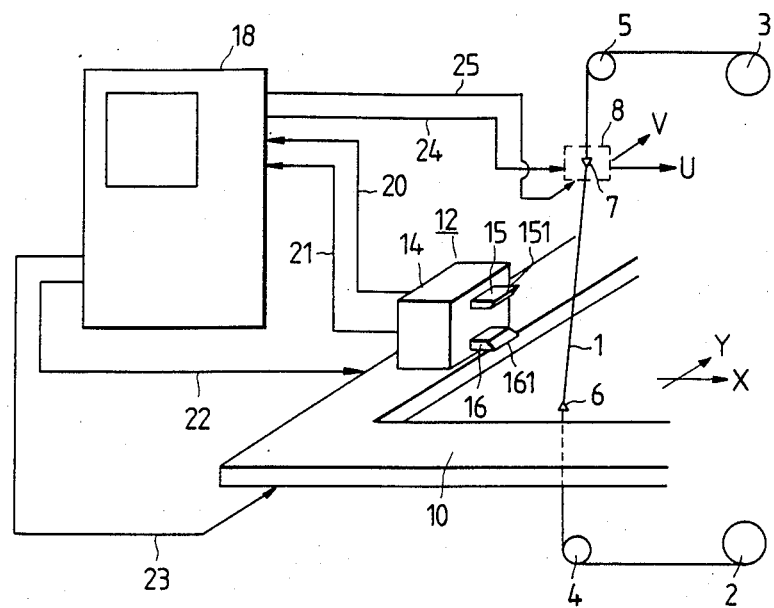
FIG. 1 is an explanatory diagram outlining a conventional device for setting a wire electrode vertical.
Figure 2:
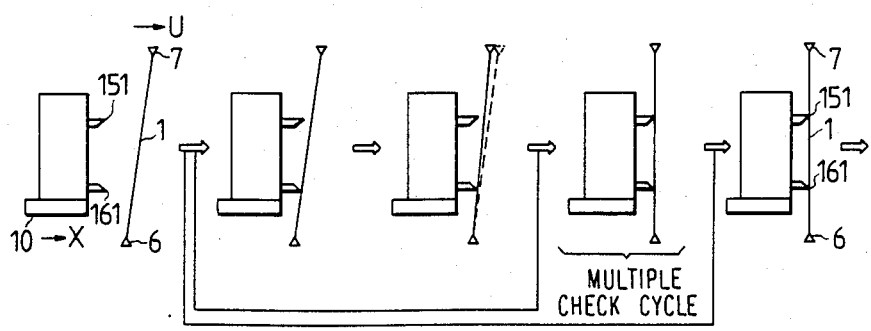
FIG. 2 at (a) through (e) is a series of explanatory diagrams for a description of a method of setting a wire electrode vertical with the conventional device shown in FIG. 1.
Figure 4:
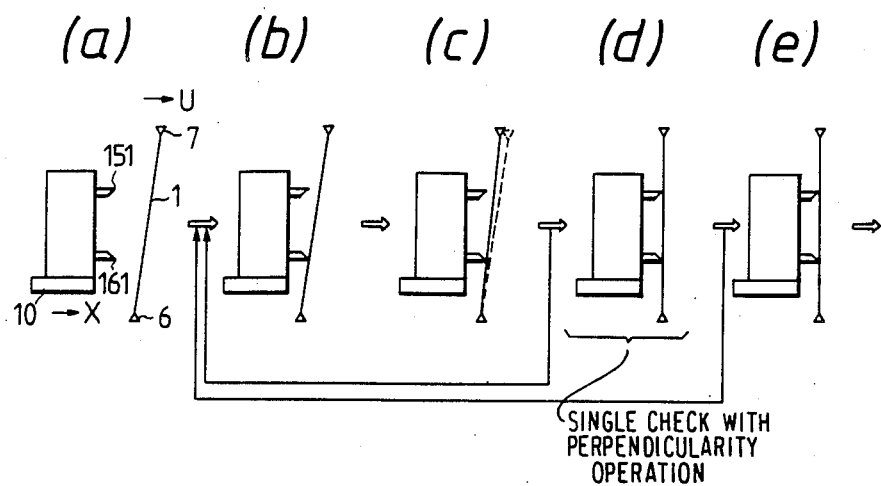
FIG. 4 at (a) through (e) is a series of explanatory diagrams for a description of the operating steps in the method of setting a wire electrode vertical according to the invention.

The above-described operations are as indicated in FIG. 4 corresponding to FIG. 2. FIGS. 4(a) through 4(d) correspond to FIGS. 2(a) through 2(d), respectively. However, it should be noted that the case of FIG. 4 is different from that of FIG. 2 in that, in FIGS. 4(d), after the upper and lower contacts are brought into contact with the wire electrode at the same time once, the above-described perpendicularity determining operation is carried out for one second.

If summarized, (1) When $N_2+N_3>K_1$,
 if $N_3/N_2>K_1$, then only the upper contact is in contact with the wire electrode;
 if $K_2<N_3/N_2<K_1$, then the upper and lower contacts are in contract with the wire electrode; and
 if $N_3/N_2<K_2$, then only the lower contact is in contact with the wire electrode.

(2) When $N_2+N_3 \leq K_1$,
 if $N_1>N_4$, the upper and lower contacts are not in contact with the wire electrode; and if $N_1 < N_4$, both of the upper and lower contacts are in contact with the wire electrode.

The data $K_1$, $k_1$ and $k_2$ with respect to N will be described with reference to FIGS. 5(a) through 5(d).

Figure 5:
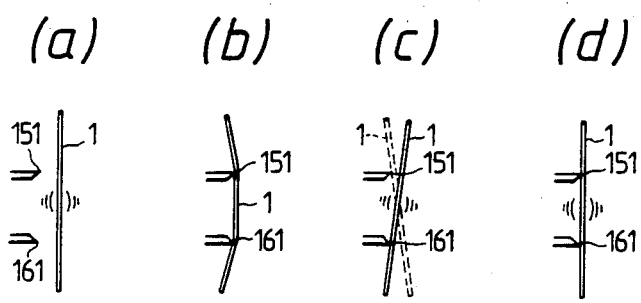
FIG. 5 is an explanatory diagram showing the relationships of constants $K_1$, $k_1$ and $k_2$ with a total number of times N of sampling operations in the method of the invention.

In the case where, as shown in FIG. 5(a), the upper and lower contacts are not brought into contact with the wire electrode at all or they are brought into contact with it only a few times, $N = N$, $N_1 \simeq N$, $N_2 \simeq 0$, $N_3 \simeq 0$, and $N_4 \simeq 0$. Therefore $N_2 + N_3 \simeq 0$, and $N_1 > N_4$. Accordingly, both of the upper and lower contacts are not in contact with the wire electrode. $N_3/N_2$ being unstable, it is one condition for determination of the simultaneous contact of the upper and lower contacts that $N_2 + N_3$ is equal or larger than the constant $K_1$.

In the case where, as shown in FIG. 5(b), the upper and lower contacts 151 and 161 are excessively forwarded, they are both in contact with the wire electrode, and $N = N$, $N_1 \simeq 0$, $N_2 \simeq 0$, $N_3 \simeq 0$, and $N_4 \simeq N$. Accordingly, $N_2 + N_3 \simeq 0$, and $N_1 > N_4$. Hence, both of the upper and lower contacts are in contact with the wire electrode. And $N_3/N_2$ is unstable.

Let us consider the case where, as shown in FIG. 5(c), only the upper contact 151 or lower contact 161 is in contact with the wire electrode. When only the upper contact 151 is in contact with the wire electrode $N = N$, $N_1 \simeq 0$, $N_2 \simeq 0$, $N_3 \simeq N$, and $N_4 \simeq 0$. When only the lower contact 161 is in contact with the wire electrode, $N = N$, $N_1 \simeq 0$, $N_2 \simeq N$, $N_3 \simeq 0$ and $N_4 \simeq 0$. Therefore, $N_2 + N_3 \simeq N$, and $N_3/N_2 \simeq 0$ (when the lower contact is in contact with the wire electrode) or $\infty$ (when the upper contact is in contact with the wire electrode). In accordance with this, the constant $k_2$ is selected as a reference value to determine that only the lower contact or the upper and lower contacts are in contact with the wire electrode, and the constant $k_1$ is selected as a reference value to determine that only the upper contact or the upper and lower contacts are in contact with the wire electrode.

In the case where, as shown in FIG. 5(d), the upper contact 151 and the lower contact 161 are substantially uniformly in contact with the wire electrode 1, $N = N$, $N_1 \simeq 0$, $N_2 \simeq N/2$, $N_3 \simeq N/2$, and $N_4 \simeq 0$, and therefore $N_2 + N_3 \simeq N$, and $N_3/N_2 \simeq 1$.

In the above-described embodiment, it is determined whether or not $N_2 + N_3$ is larger than $K_1$. However, instead of the determination, $N_4 > K_1$, or $N_1 > K_1$ may be employed to determine whether or not both of the upper and lower contacts are in contact with the wire electrode, or whether or not both of the upper and lower contacts are not in contact with the wire electrode, and the perpendicularity of the wire electrode is detected from the value $N_3/N_2$ which is the ratio of the frequency of contact of the upper contact to the frequency of contact of the lower contact.

As was described above, in the invention, the statistical method is employed for determination of the perpendicularity of the wire electrode. Therefore, even when the upper and lower contacts are brought into contact with the wire electrode by vibration of the latter, according to the total number of times of sampling operations in the predetermined period of time which is obtained after the upper and lower contacts have been brought into the wire electrode for the first time, the numbers of times of contact of the upper and lower contacts are employed as factors for determination, whereby the perpendicularity of the wire electrode can be determined with high accuracy. Thus, the wire electrode can be automatically set vertical at high speed with high accuracy.

What is claimed is:

1. A method of setting a wire electrode for a wire cut electric discharge machine perpendicular to a reference surface of a machining table, the method comprising the steps of:
   moving said machining table on which is a wire electrode perpendicularity detecting means including at least one pair of upper and lower contact members provided;
   detecting that both of said upper and lower contact member are brought into contact with said wire electrode simultaneously;
   sampling an occurrence of contact of at least one of said upper and lower contact members with said wire electrode for a predetermined period of time at each a predetermined interval;
   determining attitude of said wire electrode according to a total number of times of contact of one of said upper and lower contact members with said wire electrode and a ratio of a number of times of contact of only said upper contact member with said wire electrode to a number of times of contact of only said lower contact member with said wire electrode; and
   setting the wire electrode perpendicular to the reference surface in response to a result of the determination.

2. The setting method as claimed in claim 1, wherein in said determining step, determining whether or not said total number is larger than a predetermined value, and further determining whether or not said ratio is in a predetermined range.

3. The setting method as claimed in claim 2, wherein in said setting step, moving a wire guide in response to the result of the determination.

4. The setting method as claimed in claim 2, wherein said determining and setting steps are repeated until said wire electrode is set perpendicular to the reference surface.

5. The setting method as claimed in claim 2, wherein said determining and setting steps are repeated until said total number becomes larger than the predetermined value, and said ratio becomes in the predetermined range.

6. The setting method as claimed in claim 2, wherein in said determining step, comparing a number of times of both of said upper and lower contact members are in contact with said wire electrode and a number of times of both of said upper and lower contact members are in no contact with said wire electrode when said total number is smaller than the predetermined value; and in said setting step, moving said machining table backwardly when said number of times of both of the contact members are in contact with said wire electrodes is larger, moving said machining table forwardly when said number of times of both of the contact members are in contact with said wire electrode is smaller.

7. A wire electrode vertical setting device for a wire cut electric discharge machine comprising:
   a wire electrode;
   a wire electrode supply means including a wire electrode supply reel, first guide roller and first wire guide;
   a wire electrode take-up means including a wire electrode take-up reel, second guide roller and second wire guide;

a machining table for fixing a workpiece and allowing to move two-dimensionally;

wire electrode perpendicularity detecting means, provided on said machining table, including an upper contact member and a lower contact member;

means for determining attitude of said wire electrode according to a total number of times of contact of one of said upper and lower contact members with said wire electrode and a ratio of a number of times of contact of only said upper contact member with said wire electrode to a number of times of contact of only said lower contact member with said wire electrode; and a wire guide drive means for allowing said wire guide to move two-dimensionally in response to a determination of said determining means.

8. The device as claimed in claim 7, wherein said determining means determines whether or not said total number is larger than a predetermined value, and further determining whether or not said ratio is in a predetermined range.

9. The device as claimed in claim 8, wherein said determining means compares a number of times of both of said upper and lower contact members are in contact with said wire electrode and a number of times of both of said upper and lower contact members are in no contact with said wire electrode when said total number is smaller than the predetermined value, and wherein said wire guide drive means makes said machining table, move backwardly when said number of times of both of the contact members in contact with said wire electrode is larger, and makes said machining table move forwardly when said number of times of both of the contact members are in contact with said wire electrode is smaller.

10. The device as claimed in claim 7, wherein said wire electrode perpendicularity detecting means are provided on said machining table in two different directions.

* * * * *